(12) United States Patent
Marr et al.

(10) Patent No.: US 7,546,587 B2
(45) Date of Patent: Jun. 9, 2009

(54) RUN-TIME CALL STACK VERIFICATION

(75) Inventors: Michael David Marr, Monroe, WA (US); Scott A. Brender, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 10/790,302

(22) Filed: Mar. 1, 2004

(65) Prior Publication Data

US 2005/0198645 A1 Sep. 8, 2005

(51) Int. Cl.
*G06F 9/44* (2006.01)
*G06F 3/00* (2006.01)

(52) U.S. Cl. .................. 717/127; 717/124; 719/312; 719/320

(58) Field of Classification Search ......... 717/110–113, 717/124–135; 719/310, 312, 320
See application file for complete search history.

(56) References Cited

U.S. PATENT DOCUMENTS

| | | | | |
|---|---|---|---|---|
| 5,410,698 | A * | 4/1995 | Danneels et al. ............. 719/331 |
| 5,592,600 | A | 1/1997 | De Pauw et al. ............. 345/440 |
| 5,734,904 | A * | 3/1998 | Kanamori et al. ............ 719/331 |
| 5,794,047 | A | 8/1998 | Meier .......................... 713/133 |
| 5,802,371 | A | 9/1998 | Meier .......................... 717/133 |
| 5,892,900 | A | 4/1999 | Ginter et al. ................. 713/200 |
| 5,946,486 | A * | 8/1999 | Pekowski ..................... 717/128 |
| 5,948,113 | A | 9/1999 | Johnson et al. ............... 714/38 |
| 5,970,248 | A | 10/1999 | Meier .......................... 717/125 |
| 6,003,095 | A * | 12/1999 | Pekowski et al. ............. 717/163 |
| 6,173,421 | B1 | 1/2001 | Weaver Johnson et al. .... 714/38 |
| 6,226,618 | B1 * | 5/2001 | Downs et al. ................. 705/1 |
| 6,240,549 | B1 | 5/2001 | Hamada et al. .............. 717/130 |
| 6,442,752 | B1 * | 8/2002 | Jennings et al. ............. 717/162 |
| 6,513,155 | B1 | 1/2003 | Alexander, III et al. ..... 717/124 |
| 6,662,358 | B1 | 12/2003 | Berry et al. ................. 717/128 |
| 6,880,149 | B2 * | 4/2005 | Cronce ...................... 717/126 |
| 2002/0012432 | A1 | 1/2002 | England et al. ............. 380/231 |
| 2002/0013772 | A1 | 1/2002 | Peinado ...................... 705/51 |
| 2002/0169974 | A1 | 11/2002 | McKune ..................... 713/200 |
| 2002/0188931 | A1 | 12/2002 | Ewart et al. ................. 717/154 |
| 2003/0041267 | A1 | 2/2003 | Fee et al. .................... 713/201 |

(Continued)

OTHER PUBLICATIONS

Nitta et al., "Security Verification of Programs with Stack Inspection," 2001, ACM, p. 31-40.*

(Continued)

*Primary Examiner*—Wei Y Zhen
*Assistant Examiner*—Qing Chen
(74) *Attorney, Agent, or Firm*—Woodcock Washburn LLP (57) ABSTRACT

Run-time call stack verification is used to determine that a code module has been called by a legitimate caller. A return address on the stack indicates where execution is to return upon execution of the next return instruction, and this return address is indicative of where the code module was called from. The code module may determine that the call is allowed, or disallowed, based on the location of the return address. A calling convention is provided that allows the code module to be called through an intermediary, while also preserving the original return address that was in effect at the time the intermediary was called and also resisting modification to the call stack during the time that the original return address is being verified.

20 Claims, 6 Drawing Sheets

U.S. PATENT DOCUMENTS

| | | | |
|---|---|---|---|
| 2003/0187801 A1 | 10/2003 | Chase et al. | 705/59 |
| 2003/0194092 A1 | 10/2003 | Parks et al. | 380/281 |
| 2003/0195855 A1 | 10/2003 | Parks et al. | 705/51 |
| 2003/0226007 A1 | 12/2003 | Olson et al. | 713/150 |

OTHER PUBLICATIONS

Rabek et al., "Detection of Injected, Dynamically Generated, and Obfuscated Malicious Code," 2003, ACM, p. 76-82.*

* cited by examiner

RUN-TIME CALL STACK VERIFICATION

FIELD OF THE INVENTION

The present invention relates generally to the field of computing, and, more particularly, to the verification of a call stack.

BACKGROUND OF THE INVENTION

There are certain applications of computing in which functions performed by the computer are sensitive and need to be protected from abuse and attack. For example, in a digital rights management (DRM) system that protects valuable (e.g., copyrighted) content from being used in an unlicensed manner, the content is typically stored in an encrypted form, and is decrypted only under the circumstances specified in an electronic license. Thus, the code that applies the decryption key to generate clear content is a sensitive piece of code, in the sense that such code should not divulge the decryption key, and should provide clear content only under circumstances that provide reasonable assurance that the clear content will not be misused or distributed in a manner that is contrary to license. The piece of code that performs the decryption function or any sensitive operations is, in some contexts, referred to as a "black box." Such a black box should resist attempts by attackers to manipulate or misuse the black box binary or application which has the rights to the clear content in a manner that would divulge the key or the clear content.

A black box (or other program module that performs a sensitive function) should implement tamper-resistant measures that are designed to thwart known types of attack on the black box or the application which leverages its functionality. Typical tamper-resistance measures may include code obfuscation, code encryption, self-modification of code, and other known techniques that tend to confound analysis and manipulation of code.

While a computer program may employ tamper-resistant measures of the type described above, one security weakness not easily addressed by such techniques arises at the boundary between two code modules. Modem programs are typically modularized into components that communicate with each other by way of an interface. For example, the black box described above can be implemented as a dynamic-link library (DLL), which can be linked to, and called by, one or more application programs. The advantage to such a design is that the black box's function can be used ("consumed") by many programs, without that function having to be implemented explicitly by each program, and without the inner workings of the black box having to be explicitly disclosed to the various third party vendors who may write the consuming programs. It also allows updates to the black box software to be made, for example to fix bugs or add additional tamper-resistance, without needing to recompile and reship all of the application programs which rely on its function. The disadvantage to such a design from a security standpoint, however, is that modularization generally facilitates and encourages the interoperation of code modules (e.g., in theory, any application can link to and call a DLL), while the security of the black box may depend on restricting the circumstances under which the black box can be called (e.g., the black box should not permit its decryption function to be called by applications that might disseminate valuable content in the clear).

Standard tamper-resistance techniques are focused on setting up a boundary around a code module and protecting that boundary from breach. However, since a DLL necessarily shares a permeable interface with its calling application, the standard tamper-resistance techniques do not address the need for protection in terms of how, and under what circumstances, this interface is used to permit access to the DLL's functionality.

In view of the foregoing, there is a need for a system that overcomes the drawbacks of the prior art.

SUMMARY OF THE INVENTION

The present invention helps to prevent a code module from being used in an unauthorized manner, or under inappropriate circumstances. The invention operates by verifying the call stack in order to ensure that that the code module has been called under legitimate circumstances.

When a function is called, the caller leaves a "return address" on the program stack. The return address is the address of the instruction to which the program counter is to be pointed after the called function completes execution. Since this instruction is generally the instruction that immediately follows the call instruction, the return address effectively identifies where the called function was called from. Since the return address is located inside the calling application, the return address can be used to identify the application that made the call. If the called code module maintains a record of legitimate sources that are permitted to call the code module, the return address effectively allows the called code module to distinguish legitimate calls from illegitimate ones. Thus, a code module may permit itself to be called from certain addresses within certain applications, and may otherwise reject attempts to be called by other sources. In the case, for example, of the black box that performs decryption, an illegitimate call may indicate that a rogue application is attempting to use the black box to perform the decryption function for nefarious purposes, and upon detecting such a misuse the black box can take appropriate action.

Additional security may be provided by verifying not only that the return address is within the calling application, but also that the calling application has not been modified relative to a known state. Thus, a checksum or hash of the calling application (or of some subset of pages of the calling application) may be taken and stored; then, when the program module detects that it has been called by the calling application, this checksum or hash may be recomputed and compared with the stored checksum or hash to verify that the calling application has not been modified.

Since there are certain classes of attack that take advantage of the standard calling convention that is used to invoke the functions of a program module (e.g., by adjusting the return address on the stack so that the called function will return to an unexpected location), it is preferable that the program module to be protected not be directly exposed to the calling application. In a preferred embodiment, the calling application calls an intermediate module which, in turn, uses a non-standard calling convention to call or jump into the protected module. The non-standard calling convention is preferably designed to preserve the return address that was in effect at the time that the calling application made the call (so that the return address is available to, and can be verified by, the protected code module itself), while also being designed to cause an operating failure if the return address on the call stack is modified.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

There are some computer security models that depend on protecting a given code module from tampering or misuse. Many security technologies focus on detecting and preventing code tampering in order to prevent hackers from modifying a code module to perform an unintended function. However, it is also desirable to ensure that an unmodified code module is called only under legitimate circumstances. The present invention provides mechanisms that assist a code module in verifying the circumstances under which it has been invoked.

Exemplary Computing Arrangement

Figure 1:
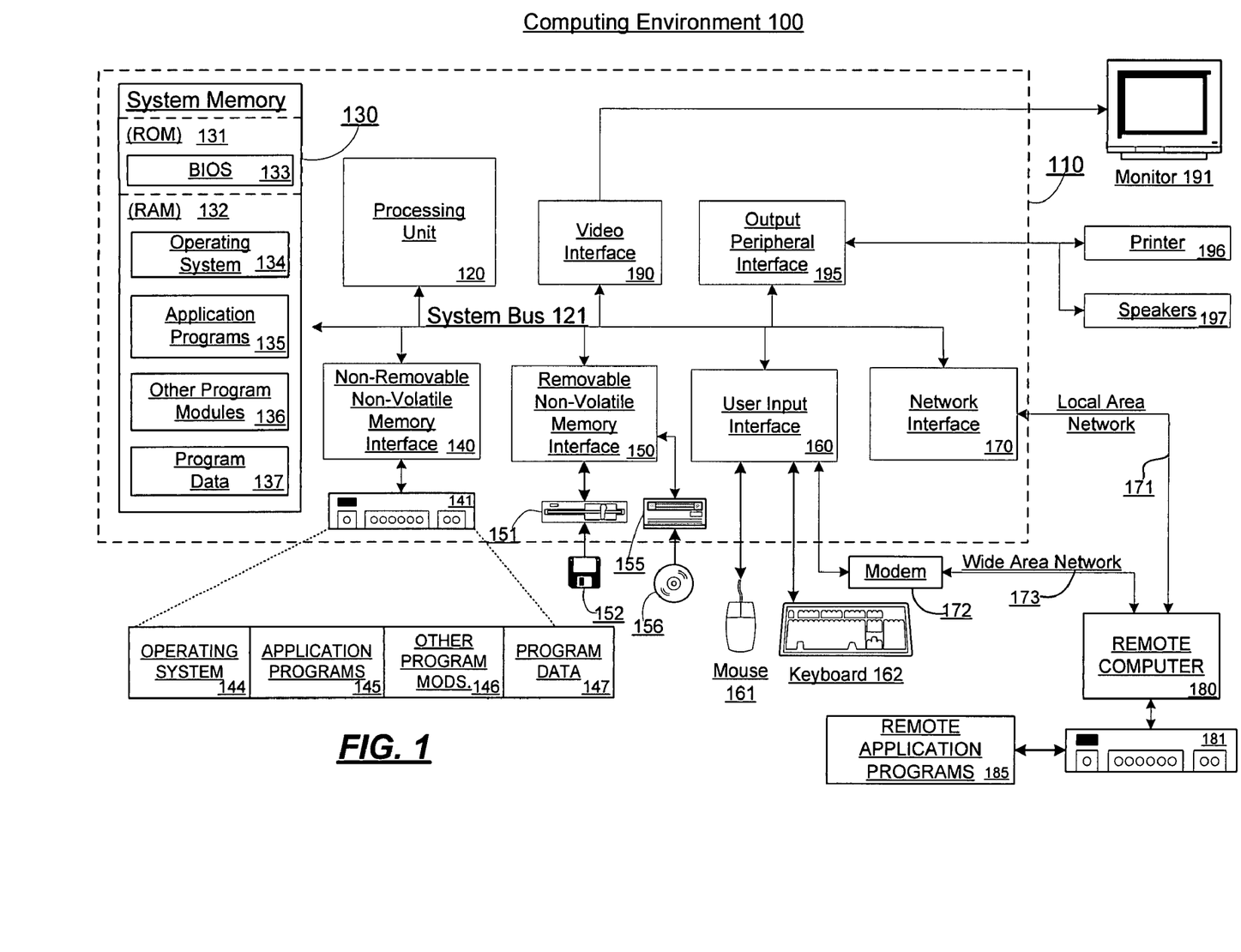
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Calling of a Dynamic-Link Library by a Program Module

Figure 2:
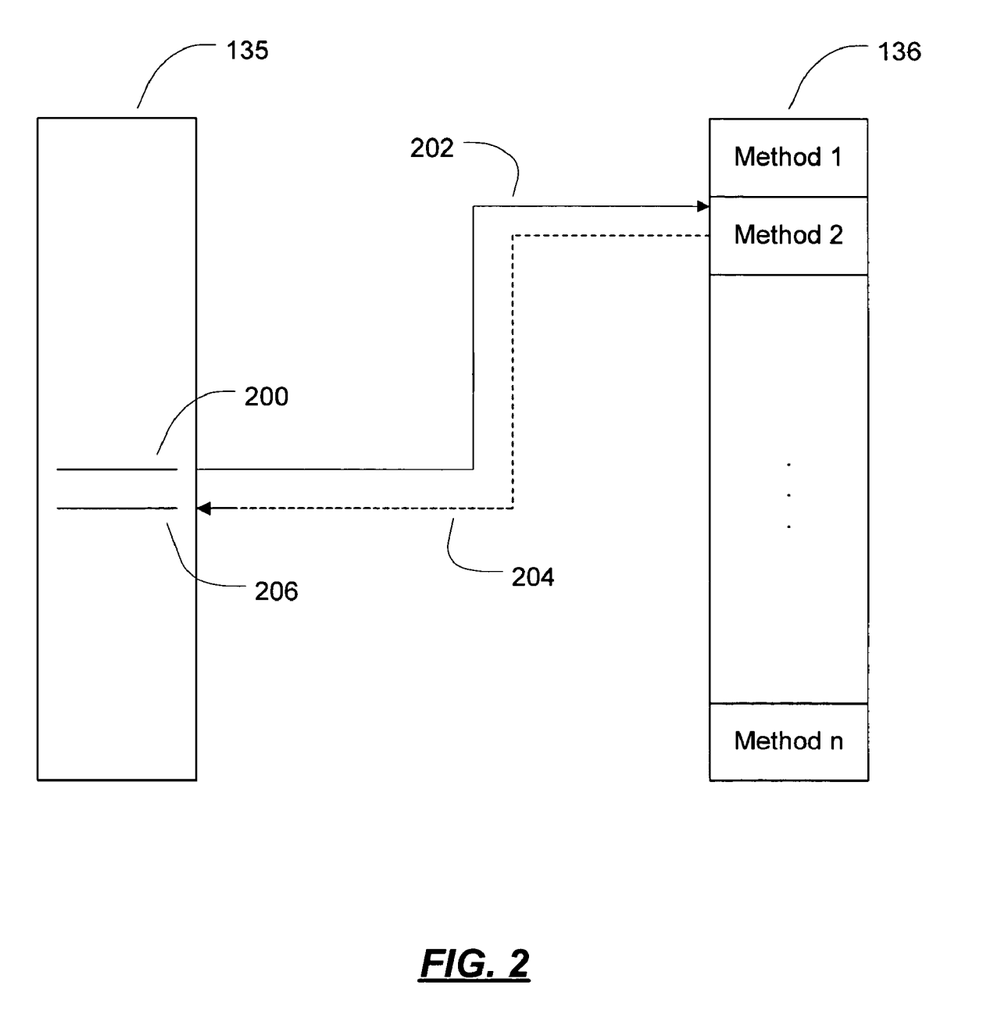
FIG. 2 is a block diagram showing the use of a dynamic-link library by a computer-program.

A computer program typically makes use of modules that have a separate and independent existence from the computer program itself. For example, when an application program 135 (shown in FIG. 1) executes, that application program may make use of a program module 136 (also shown in FIG. 1) during that execution. FIG. 2 shows how a computer program may make use of a separate program module.

In FIG. 2, application program 135 comprises a series of instructions that are located at some known place in memory. During the execution of application program 135, an instruction 200 is encountered to call a method that is not located within the boundaries of application program 135. ("Not located within the boundaries," in this context, means that the called method is located outside of the portion of memory that is allocated to application program 135.) In the example of FIG. 2, instruction 200 causes a method in program module 136 to be called.

Program module 136 may, for example, be a dynamic-link library ("DLL")—i.e., a file containing a set of executable methods (or functions) that can be loaded into memory and executed by a program such as application program 135. In the example of FIG. 2, program module 136 contains methods 1 through n, and the call 202 issued by application program 135 invokes the second method. When call 202 is made, the processor on which application program 135 is executing begins to execute method 2. Method 2 will likely contain a "return" instruction; when the return instruction is encountered, the processor will return (204) to application program 135 and will resume executing application program 135 at the instruction contained at address 206. Since address 206 is where execution resumes after the "return" instruction is encountered, address 206 is referred to as a "return address." As is known in the art, standard calling conventions generally store the return address on the stack at the time of the call.

It will be understood that FIG. 2 shows application program 135 as the computer program that makes use of a separate program module; however, any type of computer program may use a separate program module, and an "application" is merely one example of such a computer program. In general, the environment in which a computer program executes may permit one program module (of which an "application program" is just one example) to make use of another program module.

Use of a Return Address to Identify a Caller

Typically, return address 206 is the address of the memory location that immediately follows the call instruction. Since return address 206 is part of the computer program (or other program module) that issued the call instruction, the identity of return address 206 essentially identifies the calling entity. Since one DLL can be called by different entities, knowing the return address allows identification of the entity that issued the last call instruction that was issued prior to entry of the DLL when using standard calling conventions and an import address table.

Figure 3:
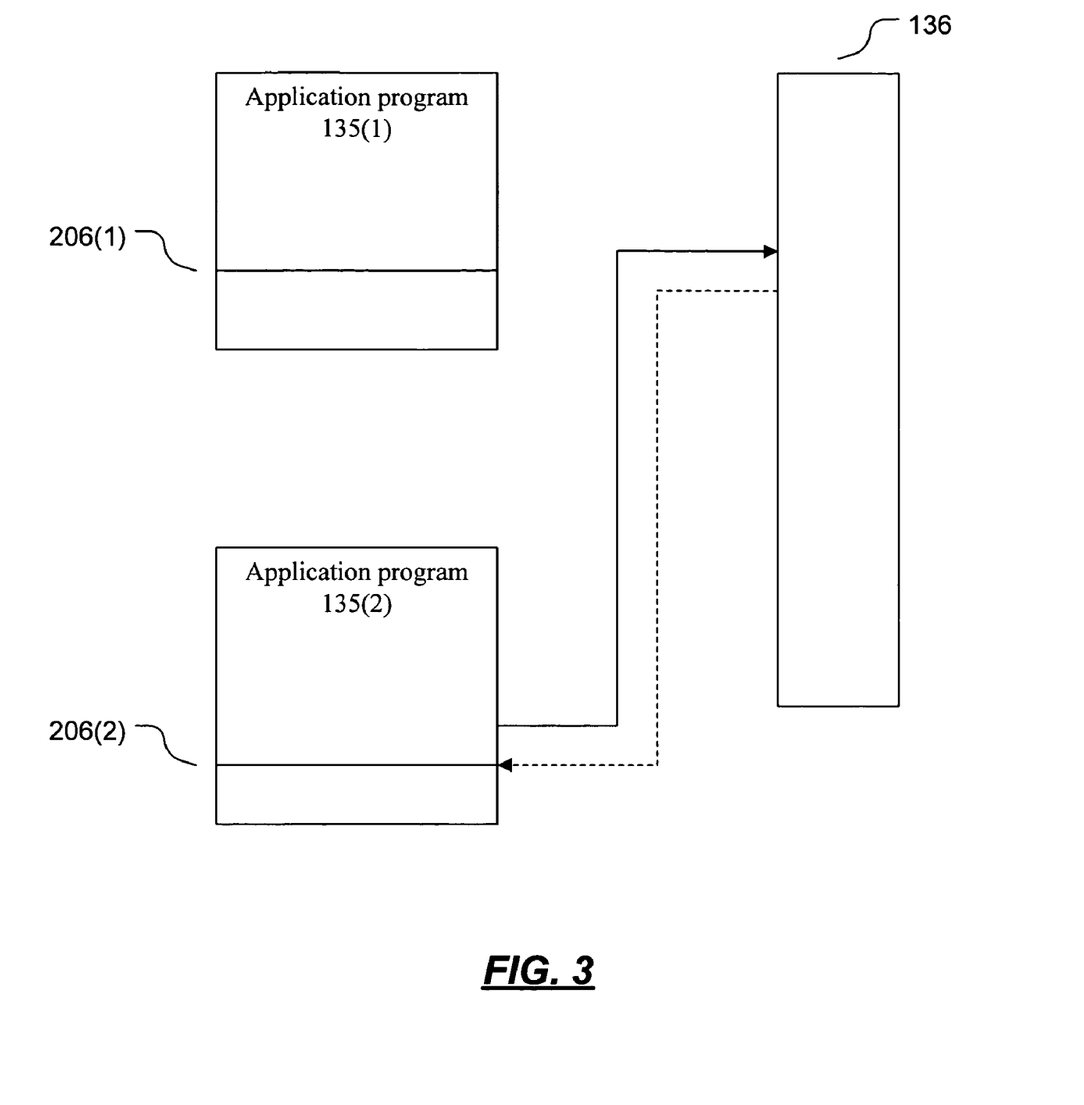
FIG. 3 is a block diagram of a calling function and its return address, and the inference of the caller's identity from the return address.

FIG. 3 shows two applications programs 135(1) and 135(2) that exist on the same computer as program module 136 (which may be, for example, a DLL). Application program 135(2) calls program module 136, and the return address of the call is the address of memory location 206(2). (As is known in the art, the return address is typically stored at an identifiable location on the program stack.) Since memory location 206(2) is within application program 135(2), it can be inferred from examining the return address that the last call instruction was issued by application program 135(2). If the return address had been the address of memory location 206(1), then it could be inferred that the last call instruction was issued by application program 135(1), since memory location 206(1) is located within application program 135(1). Thus, FIG. 3 shows how the return address may imply the identity of the caller.

Moreover, the return address may imply not merely the identity of the calling program, but also a specific location within the calling program. Since the return address is typically the address that immediately follows the call instruction, knowing that the return address is the address of memory location 206(2) may imply that program module 136 was called by a particular function (or even particular line of code) within application program 135(2).

Being able to identify the caller may have useful security implications. For example, program module 136 may be cryptographic software that hides a decryption key and uses the key to decrypt valuable content. The security model in which such cryptographic software participates may be such that program module 136 should only perform the decryption function for callers of verifiable integrity. For example, application program 135(2) may be an application that has been certified as being capable of protecting valuable content from illicit copying, whereas application 135(1) may be an unknown application (or an application that is known to exhibit rogue behavior with respect to valuable content). Thus, application 135(2) should be allowed to call program module 136 to perform the decryption function, while application 135(1) should not be allowed to call program module 136. Thus, it may be useful for a called program module 136 to be able to identify its caller, and the return address is one mechanism by which the caller can be identified.

Integrity of Identified Caller

As described above in connection with FIG. 3, a return address can be used to identify a caller. As further described above, such identification of the caller has security implications, since there are security models that depend on certain functions being callable only by known programs whose behavior is understood. In this sense, identifying the caller provides a measure of security to the extent that an identifiable caller will exhibit known behavior. However, this type of security can be thwarted if the "known" caller can be modified to behave in some unexpected manner. For example, when security is based on requiring a function to be called only by a certified calling application, a hacker may modify the certified calling application to exhibit nefarious behavior.

Such an attack on the security of the system can be thwarted by verifying that the caller's code (or at least a portion of the caller's code) has not been modified relative to some known state for that code. Thus, it is desirable to store a checksum, hash, or similar datum that represents the calling code in a known state. For example, in FIG. 4 application 135 is the calling application. Application 135 makes a call to an external program module 136, with a return address 206. Program module 136 regards application 135 as a legitimate caller, and regards calls with return address 206 as coming from a legitimate place within application 135, and this checksum is stored. Checksum 404 may be derived from the entirety of application 135, or from the page(s) that immediately surround return address 206 (reference numeral 402). At the time that program module 136 is called from application 135, checksum 404 can be recomputed based on application 135 (or pages 402) and then compared with the stored checksum. If the re-computed and stored checksums match, it can be inferred that application 135 (or the relevant pages 402 of application 135) have not been modified relative to a known previous state. Example mechanisms for verifying that a caller has not been modified are more particularly discussed below in the section entitled "module authentication," and in subsequent sections.

Figure 4:
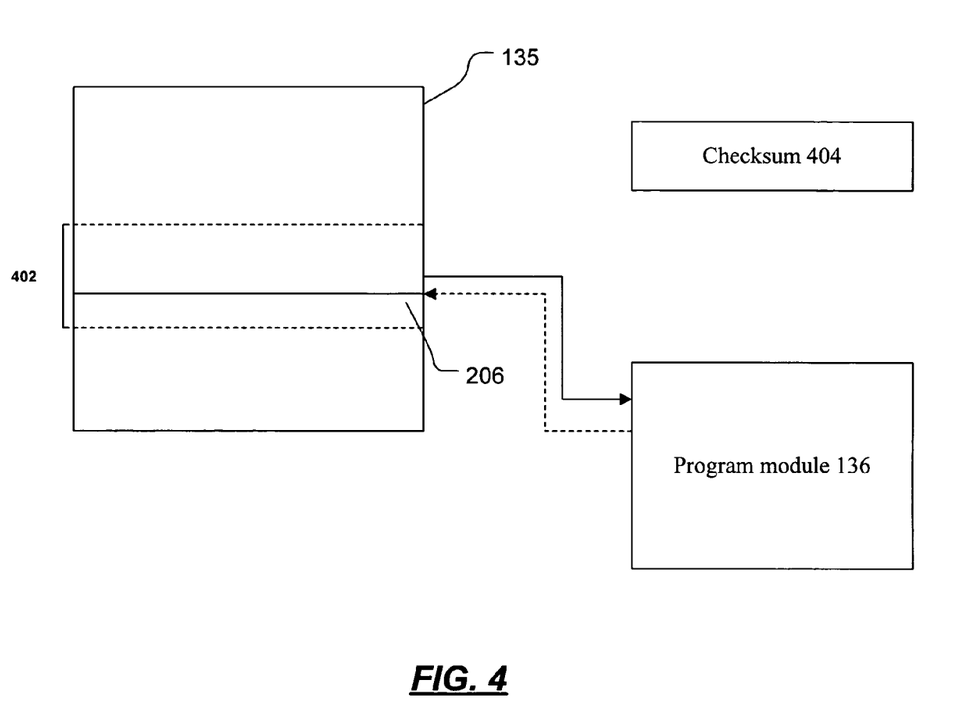
FIG. 4 is a block diagram of a calling function and a stored checksum that can be used to verify non-modification of the calling function or a portion thereof.

As noted above, in one security model program module 136 performs a sensitive function (e.g., the decryption of valuable information), and should only perform this function for a caller whose behavior is known and trusted (e.g., an application that will render the valuable content in an ephemeral manner, but that will not allow the content to be disseminated in the clear to other users). Thus, the caller's return address allows the caller to be identified so it can be determined whether the caller is a known and trusted caller; additionally, verifying checksum 404 allows it to be determined that the caller's code (and, therefore, its behavior) remains in the state that the code was in at the time the checksum was created (at which time the caller's behavior, presumably, was believed to be trustworthy).

Indirect Calling of Program Module

When a program module needs to be protected from misuse or tampering, security benefits can be derived from exerting tight control on the manner in which the program module can be entered. One way to achieve this control is to prevent the program module from being called directly by applications. Instead, an intermediate module can be exposed to applications, and all calls to the protected program module may be made by the intermediate module on behalf of the application that calls the intermediate module. This structure ensures that the protected program module is always called by a known entity. Moreover, as more particularly discussed below, the known entity can use a special calling convention to enter the protected program module, and this calling convention can be designed to provide additional security.

Figure 5:
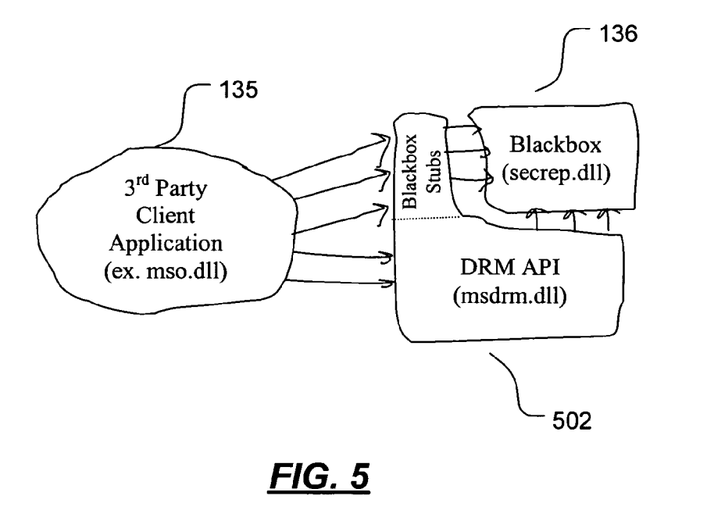
FIG. 5 is a block diagram of a computer program that calls a first dynamic-link library through a second dynamic-link library.

Thus, in the example of FIG. 5, program module 136 is a dynamic-link library (DLL) that performs sensitive functions that should be performed under controlled circumstances (e.g., decryption of valuable information). Application 135 (depicted, by way of example, as a "3rd party client application") is a software application that calls on program module 136 to perform such functions. (Program module 136, in the example of FIG. 5, is a "black box," which is discussed above; additionally, in the example of FIG. 5, the black box is implemented as a DLL named "secrep.dll".) Application 135, however, does not call program module 136 directly, but rather calls program module 136 through an intermediate module 502. In the example of FIG. 5, intermediate module 502 is a DLL named "msdrm.dll," which exposes an application programming interface (API) that provides DRM-related functions to applications. Program module 502 includes functionality called "black box stubs," which are the code segments that are callable by application 135 and are used by intermediate module 502 to call into the black box. Preferably, the stubs are carefully contrived hand-coded assembly language stubs that perform a unique calling convention into the black box; such a calling convention is more particularly described below. (It should be understood that the references to DRM functionality and to the black box are merely exemplary, and the structure of FIG. 5 is not limited to DRM systems.)

Thus, program module 136 is not exposed directly to application 135. There are certain classes of attacks that allow program module 136 to be misused by application program 135; these attacks are based on application program 135's having a direct interface to program module 136, so requiring application program 135 to call program module 136 indirectly helps to guard against this class of attack. Preferably, intermediate module 502 uses a non-standard calling convention to call program module 136. An example of such a non-standard calling convention is more particularly discussed below.

Calling Convention

As discussed above, using a non-standard convention may be part of an overall security framework. A non-standard calling convention may thwart certain types of attacks that are based on the protocol by which function calls occur. Additionally, the particular non-standard calling convention described below has the advantage that it can preserve a caller's return address across more than one call boundary (i.e., if function 1 calls function 2, which calls function 3 using the non-standard calling convention described below, then function 1's return address can be known to function 3; under a standard calling convention, function 1's return address would be generally unavailable to function 3).

In the example of FIG. 5, program module 502 is exposed to application 135, but program module 136 is not exposed to application 135. However, program module 502 contains "stubs" that can be used to enter program module 136—i.e., application 135 invokes the stubs, and this invocation identifies the particular functionality from program module 136 that application 135 would like to perform. The stubs, in turn, invoke the relevant code in program module 136. Program module 136, in this example, includes the code need to verify and authenticate the caller (i.e., application 135), and the stubs contain data required by the verification and authentication code. Preferably, this data is mixed into the stubs' instruction streams. The call into program module 136 passes the address of this data to the verification and authentication code "surreptitiously." That is, data used by the verification and authentication code is inserted into the instruction stream immediately after the call to program module 136; since the call causes the address immediately following the call instruction to be pushed onto the stack as a return address, the stack contains a pointer to the data in what would be the return address using a standard calling convention. If a standard tool were to patch the stub, then the return address will no longer point to the actual data that is needed by the verification function. The address of the stub itself is also preserved and the entire stub is verified by the code that ultimately executes the call (or jump) into the code providing the requested functionality, for example a content decryption request, in program module 136.

On the x86 processor architecture, the DRMxxxStub therefore looks like (in pseudo-assembly):

| push cArgs | ; number of DRMxxx function parameters |
| call dword ptr [g_pfnBBJump] | ; call blackbox "demux" authenticator |
| 0x07 | ; data injected in instruction stream |

The return address pushed on to the stack as a result of the "call" will actually point at the "0x07" data. The blackbox demux authenticator will not actually return to that location, but will simply use the data and return directly to the calling application instead. This prevents standard profilers and binary patching tools from adding logging or redirection code at this interface, and prevents debuggers from adding breakpoints. It should be noted that data such as "0x07" is different for each stub and will be interpreted as a random instruction opcode by disassemblers (in this case, "pop es"), which is also a benefit. Since most instructions are longer than one byte, the bogus opcode will cause further mistakes in the disassembly as parts of other stubs are interpreted as part of that instruction (i.e. the disassembler gets "out of alignment").

On an x86, the following is the call stack layout upon entering BBJump:

```
//           |
//           |-------------------------------|
//           |DRMxxx Stub Return Address     | esp
//           |-------------------------------|
//           |Parameter Depth (cArgs)        | esp+ 4h
//           |-------------------------------|
//           |Ret Addr App/msdrm.dll         | esp+ 8h
//           |-------------------------------|
//           |DRMxxx Parameter 1             | esp+ 8h+4h
//           |-------------------------------|
//           | ...                           |
//           |-------------------------------|
//           |DRMxxx Parameter n             | esp+ 8h+nDepth
//           |-------------------------------|
//           |App/msdrm.dll local stack      | esp+0Ch+nDepth
```

BBJump uses the DRMxxx Stub return address to verify the stub has not been modified and to access the embedded data, which is actually a vtable entry descriptor for the desired DRM service. This descriptor and the "Parameter Depth" are used by the demux to call the desired function, DRMxxxPub, inside the blackbox and to prepare the stack for return to the application (i.e. resetting the stack to adhere to _stdcall calling convention). The vtable is a covered (i.e. encrypted) list of function pointers inside the binary, in random order (i.e. encrypted and ordered uniquely for each blackbox).

After verification, the application return address is inserted in the stack below the DRMxxx parameters, so that BBJump will return directly to the application rather than the stub. The DRMxxx Stub Return Address is replaced on the stack with the address of the DRMxxxPub address, and the cArgs is replaced with a return address inside BBJump for cleanup. The following shows the stack after these replacements have been performed:

```
//           |-------------------------------|
//           | DRMxxxPub Address             | esp
//           |-------------------------------|
//           | BBJump_Cleanup address        | esp+ 4h
//           |-------------------------------|
//           | Ret Addr App/msdrm.dll        | esp+ 8h
//           |-------------------------------|
//           | DRMxxx Parameter 1            | esp+ 8h+4h
//           |-------------------------------|
//           | ...                           |
//           |-------------------------------|
//           | DRMxxx Parameter n            | esp+ 8h+4*cArgs
//           |-------------------------------|
//           | Ret Addr App/msdrm.dll        | esp+0Ch+4*cArgs
//           |-------------------------------|
//           | App/msdrm.dll local stack     | esp+10h+4*cArgs
//           |-------------------------------|
```

By doing this, the subsequent jump into the unique v-table uncovering code will transition into the DRMxxxPub function when it attempts to "return" to BBJump. That is, the address of the DRMxxxPub function is surreptitiously used by BBJump to force the blackbox to transition into the DRMxxxPub function without returning to BBJump and making another call. Since the BBJump Cleanup address has been inserted below that, DRMxxxPub will return directly to BBJump for cleanup, which includes obliterating sensitive data from the recently used parts of the stack.

The code which performs the call stack verification expects that the DRM API was called through the application's Import Address Table (IAT), the default behavior when the linker links the binary to a DLL. The call site is verified to have one of the standard IAT transitions. In theory, the application should call directly to the address of the blackbox stub function which called into BBJump. However, the "tail-call optimization" prevents generally requiring this (i.e. the call might be to another part of the application which then jumps into the blackbox stub). ("Tail-call optimization" refers to the case where the last instruction in a first function is to call a second function. Since it is not necessary to be able to return to the first function to execute more instructions, a compiler can optimize the generated code by generating an instruction to jump into the second function—thereby saving the relatively high cost of performing a true function call to the second function. The return instruction in the second function will then cause a return not to the first function, but rather to the function that issued a call to the first function (or, more generally, to whatever context appears at the next level down the call stack). This optimization saves the expense of one function call and one return, but the cost of this optimization, from the perspective of call-stack verification, is that the call stack cannot be used to verify that the second function was called by the first, since a jump into the second function is not reflected in the call stack.) Additional restrictions on how the application is built, however, could enable this verification. The following is the expected instruction stream for an IAT call:

```
// IAT indirection (disp32 is an address in the IAT):
//          ; call relative disp32 (i.e. function call within module)
//          Caller:   call Thunk                      ; E8    EB 7E 01 00
//                    call 00017EEBh                  ; E8    EB 7E 01 00
//          ...
//          ; jmp absolute indirect disp32            Mod=00 Op=100 R/M=101
//          Thunk:    jmp dword ptr [disp32]          ; FF 25 0C 11 CB 00
//                    jmp dword ptr [00CB110Ch]       ; FF 25 0C 11 CB 00
// or:
//          ; call absolute indirect disp32           Mod=00 Op=010 R/M=101
//          call dword ptr [disp32]                   ; FF 15 0C 11 CB 00
//          call dword ptr [00CB110Ch]                ; FF 15 0C 11 CB 00
//
// Note:    The compiler uses the first convention by default across DLL
//          boundaries. However, if __declspec(dllimport) modifier is specified
//          with the function declaration (i.e. in the header for the API), the
//          compiler will resolve the function name to __imp_xxx which yields
//          the second convention.
```

The verification code also checks that the BBJump and blackbox stub code has not been tampered with. Here is the instruction stream it expects, respectively:

```
//                     |----  |
// pbBBJump[-10]       | 8D   |===            |
//                     |----  |               |
// pbBBJump[-9]        | 44   |               |
//                     |----  |               |-lea eax, [esp-4h]
// pbBBJump[-8]        | 24   |               |
//                     |----  |               |
// pbBBJump[-7]        | FC   |===            |
//                     |----  |
// pbBBJump[-6]        | 50   |-push eax
//                     |----  |
// pbBBJump[-5]        | E8   |================                |
//                     |----  |                                |
// pbBBJump[-4]        | xx   |===            |                |
//                     |----  |               |                |
//                     | xx   |               |                |-call BBCheckStack
//                     |----  |               |-dwCallDelta    |
//                     | xx   |               |                |
//                     |----  |               |                |
//                     | xx   |===            |================|
//                     |----  |
// pbBBJump[ 0]        | 85   |===            |
//                     |----  |               |-test eax, eax
// pbBBJump[ 1]        | C0   |===            |
//                     |----  |
```

```
//
//------------------------------------------------------------------------
//
//                  |----   |
// pbStubRA[-8]     | 6A    |==========             |
//                  |----   |                       |-push cArgs
// pbStubRA[-7]     | xx    |-cArgs===              |
//                  |----   |
// pbStubRA[-6]     | FF    |==================     |
//                  |----   |                       |
// pbStubRA[-5]     | 15    |                       |
//                  |----   |                       |
// pbStubRA[-4]     | xx    |===     |              |
//                  |----   |        |              |-call dword ptr [g_pfnBBJump]
//                  | xx    |        |              |
//                  |----   |        |-pdwBBJump    |
//                  | xx    |        |              |
//                  |----   |        |              |
//                  | xx    |===     |============  |
//                  |----   |
// pbStubRA[ 0]     | xx    |-iVTable
//                  |----   |
//
//------------------------------------------------------------------------
//
// pbAppRA always points to the instruction following a call.  However, the
// call might have ultimately reached us:
// 1) direct:     call absolute indirect (reg and/or disp32) to DRMxxx
// 2) chain:      call relative to series of functions which jmp absolute
//                indirect, the last of which jmps to DRMxxx
// IAT is a special case of 2), where the chain is only 1 deep.  2) can also
// occur as a compiler optimization if a call to a function is the last
// instruction of the caller function (and stack clean up is not an issue).
//
```

Figure 6:
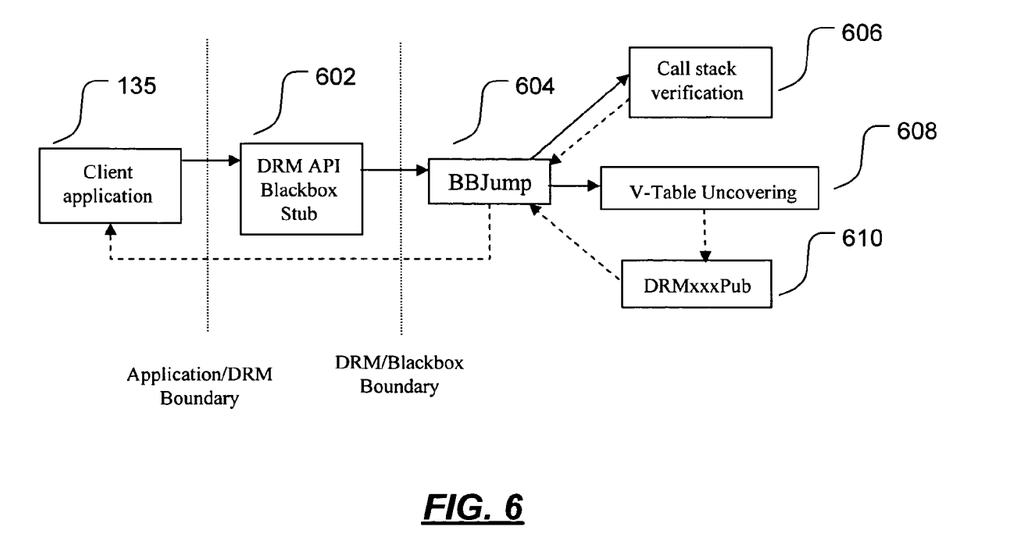
FIG. 6 is a diagram showing a flow of execution when a method in a dynamic-link library is called in accordance with aspects of the invention.

FIG. 6 shows an example flow of execution when the calling process described above is used. Initially, client application 135 places a call to a black box stub 602, which may be part of the intermediate module 502 shown in FIG. 5. The black box stub then calls BBJump 604. At the time of the call to BBJump, the return address that was in effect at the time that the black box stub 602 was called is preserved so that it can later be used by the call stack verification routine 606. Additionally, as discussed above, data is injected into the stub instruction stream that is later used to identify the black box function that will be invoked after call stack verification. BBJump 604, in turn, calls the call stack verification routine 606. Upon return from the call stack verification routine 606, BBJump 604 jumps into the v-table uncovering code 608 that identifies the black box function to be invoked; as noted above, the identity of the function to be invoked is based on the data injected into the stub instruction stream. The v-table uncovering code 608 then jumps into the function 610 that the application 135 desired to call. Upon return from this function, execution control is passed back to the client application 135 at the return address that was in effect at the time that black box stub 602 was called. It should be noted that there is preferably no return to the black box stub 602 itself; as described above, the call stack is preferably manipulated in a way that causes return to black box stub 602 (or to any portion of intermediate module 502) to be bypassed.

Example Process of Verifying a Call Stack

Figure 7:
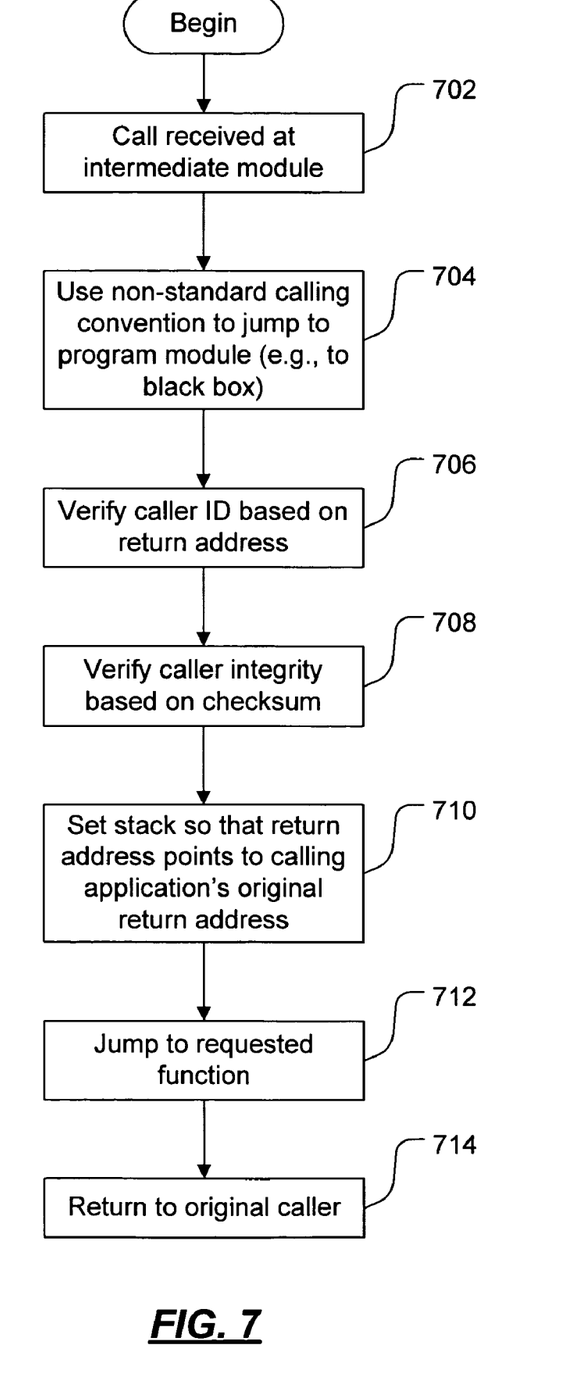
FIG. 7 is a flow diagram of an example call-stack verification process in accordance with aspects of the invention.

FIG. 7 shows an example process of verifying a call stack—i.e., verifying that a program module has been called under accepted circumstances.

Initially, a call from an application program is received 702 at an intermediate module (e.g., intermediate module 502, shown in FIG. 5). The intermediate module uses a non-standard calling convention to call into (or jump to) 704 a program module. As discussed above, the non-standard calling convention resists certain classes of attacks involving the program module that would be easily carried out if there were a conventional interface into the program module. The identity of the caller is then verified 706 based on the return address of the original call. The relevant return address is that which was specified when the initial call was made at 702; the non-standard calling convention is designed, among other things, to preserve this return address in some manner so that it can be verified from inside the program module that is called at 704.

After the identity of the original caller has been identified based on the return address at 706, the integrity of the caller is verified at 708 based on a checksum—i.e., a checksum is computed based on the caller (or some portion thereof), and the computed checksum is compared with a stored checksum. Assuming that the caller's integrity is verified, the stack values are set 710 so that the return address points back to the original caller (i.e, the caller who made the call to the intermediate module). A jump is then made 712 into the part of the program module that will perform the function requested (i.e., the function that the original caller desired to perform when making the call at 702), and, when this function is complete, a return instruction is then executed 714 which pops the stack and returns to the return address that was placed on the stack at 710 (which is the same as the return address specified by the original caller).

Module Authentication

As noted above, one feature provided herein is to authenticate the code that calls a program module—i.e., to verify that the code surrounding the call has not been modified relative to a known state. The following description relates to the module authentication procedure.

Module authentication is a security feature that helps protect the application execution environment against tampering. When used properly, it provides some level of protection against code patching, redirection and software breakpoints. The level of protection is dependent on the number of modules in the applications process space that are authenticated and the frequency of the authentication.

There are two phases to module authentication. Static authentication is a one-time check of module on-disk images while dynamic authentication is a check of the in-memory module images. Dynamic authentication is ongoing process since tampering can occur anytime in the life of the application process.

In practice, application performance and the openness of a Win32 process limit authentication to a subset of modules. The application specifies this subset of all its loaded modules via the application manifest. All modules that receive sensitive data should generally be authenticated.

Static Module Authentication

The purpose of static module authentication is to establish the authenticity of the on-disk images of important executable modules in the application process space. This includes both application and system modules. Static authentication does little to protect the execution environment directly, but it does serve an important purpose:
   It gives some assurance of the identity of the running application beyond just a module name matching.
   It provides a basis for determining if the in-memory image of the application is authentic (a basis for dynamic module authentication).

Standard Static Module Authentication

For standard static authentication, the PE (portable executable) file on the persistent storage device (which is usually a disk, but can also be flash memory on a portable device) is hashed and checked against a signed hash value. To compute the file hash, the PE headers of the file must be parsed in order to avoid hashing data that can legitimately change after the file is created. Examples are timestamps and global data sections. The algorithm for hashing the PE file is the same one used by WINDOWS™ operating system for signing system binaries.

Dynamic Module Authentication

Dynamic module authentication is the authentication of the in-memory images of modules loaded in the process. While static module authentication only gives an assurance that the executable file on disk hasn't been tampered, dynamic module authentication gives an assurance that code pages in memory haven't been tampered. It is the mechanism by which the RM system protects the application's execution environment against attacks such as code redirection via import tables or inserted jump instructions and even software breakpoints (int 3's). Since code pages can be tampered anytime during the life the process, dynamic module authentication is an ongoing task. Dynamic module authentication can be expensive and has to be managed carefully.

The setup of dynamic authentication involves computing the expected in-memory page hashes of all read-only module pages. The page hashes are stored in tables for quick reference in subsequent page verification. The basis for establishing what the code pages should look like in memory is a signed disk image of the PE file itself or its corresponding prehash. Determining the expected page hash is complicated by the existence of relocations and import address tables. Authenticating relocated pages and import tables forces us to apply the logic used by the WINDOWS™ operating system loader. For example, if the module being authenticated was rebased by the OS, we have to apply relocation fix-ups to the appropriate addresses before computing each page hash. If the module has static imports or delay imports, we have to mimic the loader when computing the expected import address table (IAT).

The verification phase involves computing hashes of actual memory pages for comparison with expected hash values stored during dynamic module authentication setup. Two types of verification are enabled. First, arbitrarily-sized portions of the authenticated modules can be checked at run-time for verification. This checking can be performed on a random sample of pages to increase the likelihood of detecting tampering in a large application. The second type of validation enabled is that of run-time call stack validation. If it is assumed that the address of the instructions in the application that call into the RM system can be reliably determined, dynamic module authentication enables targeted verification of the application. The address of the caller can be validated to come from within an "allowed" module. This prevents calls into the RM system directly from untrusted code. In addition, the memory pages surrounding and containing the call instruction to the RM system can be authenticated to protect against tampering. This check prevents an adversary from using a tampered "allowed" caller.

IAT Checking

A simple and common way to redirect code is to modify a module's import address table (IAT). We attempt to prevent this obvious attack as part of dynamic module authentication. We protect both static IATs and delay load IATs by independently constructing ("binding") the IATs and comparing to the actual IAT in use.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. In a runtime environment comprising a first program module, at least one second program module and a call stack, a method of invoking a desired method associated with a desired second program module, comprising:
   in a third program module associating each of a plurality of stubs respectively with each of a plurality of methods associated with the at least one second program module, wherein each stub comprises a code segment performing a unique non-standard calling convention into the at least one second program module, wherein each stub includes at least a first instruction to push function parameters onto the call stack, a second instruction to call an authenticator module for authenticating that a stub has not been modified and a third instruction comprising embedded unique data for the stub, wherein the embedded unique data comprises a vtable entry descriptor for the desired method, corresponding to a vtable for the third program module, wherein the vtable is covered and comprises a list of function pointers to functions associated with the at least one second program module arranged in a random order, the random order unique for the at least one second program module; and from the first program module, issuing a first call to a stub in the third program module associated with the desired method, whereupon after the first call, the call stack comprises at least a first parameter corresponding to a return address associated with the stub, a second parameter corresponding to a parameter depth (cArgs) and a third parameter corresponding to a return address of the first program module, the first, second and third parameters arranged in a top-down order;

wherein the third program module calls the at least one second program module using a non-standard calling convention.

2. The method of claim 1, wherein upon returning to the authenticator module from a jump to the vtable uncovering code, an address associated with the desired method on the call stack automatically causes calling of the desired method associated with the third program module and whereupon completion of the desired method, the return address of the first program module on the call stack automatically causes return to a cleanup function, whereupon completion of the portion of the authenticator module corresponding to the cleanup function, the return address associated with the stub on the call stack causes return to the first program module.

3. The method of claim 1, wherein the desired method performs static authentication of the first program module.

4. The method of claim 3, wherein the desired method performs dynamic authentication of the first program module.

5. The method of claim 1, wherein said authentication comprises:
examining the call stack to identify a return address, and determining that the return address is part of a program module that is permitted, according to a standard or rule, to invoke functionality associated with the at least one second program module.

6. The method of claim 5, farther comprising:
determining that said return address is from a location or range of locations within said first program module from which invocation of said functionality is permitted to originate.

7. The method of claim 1, farther comprising:
verifying that said first program module, or a portion thereof, has not been modified relative to a previously-known state.

8. The method of claim 1, wherein said first program module is, or is part of, an application program.

9. The method of claim 1, wherein said at least one second program module comprises a dynamic-link library.

10. The method of claim 1, whereupon executing the second instruction in the stub, an authenticator module is called, the authenticator module:
verifying that the associated stub has not been modified utilizing the return address of the associated stub;
if verification is not successful, not calling the second program module and terminating execution; and
if verification is successful:
inserting a first return address of the first program module on the call stack;
replacing the return address associated with the stub on the call stack with an address associated with the desired method;
replacing the second parameter (cArgs) on the call stack with a second return address associated with the authenticator module, the second return address corresponding to a portion of the authenticator module for performing a cleanup function; and
causing a jump into vtable uncovering code associated with the vtable entry descriptor, causing execution of the desired method, automatically bypassing the authenticator module upon return and automatically calling the cleanup function, wherein the desired method authenticates the first program module using the return address of the first program module having been preserved on the call stack.

11. A method of verifying a context in which a first program module has been called, the method comprising:
examining a call stack of a process in which said first program module executes to identify a return address in which control of the process will return upon completion of a call to said first program module;
determining that said return address is located within a second program module that is permitted to call said first program module, said determining comprising checking a datum that represents a calling code used by the second program module, the datum being derived from a portion or the entirety of the second program module, the first program module being called by the second program module via a third program module having one or more stubs with code segments that are callable by the second program module as an intermediary, the one or more stubs comprising data required during a verification by the first program module, said data required during said verification being mixed into instruction streams provided by the one or more stubs, the data also comprising information that is used to identify a function that will be invoked after the verification, wherein each stub comprises a code segment performing a unique non-standard calling convention into the second program module, wherein each stub includes at least a first instruction to push function parameters onto the call stack, a second instruction to call an authenticator module for authenticating that a stub has not been modified and a third instruction comprising embedded unique data for the stub, wherein the embedded unique data comprises a vtable entry descriptor for a desired method, corresponding to a vtable for the third program module, wherein the vtable is covered and comprises a list of function pointers to functions associated with the second program module arranged in a random order, the random order unique for the second program module;
from the first program module, issuing a first call to a stub in the third program module associated with the desired method, whereupon after the first call, the call stack comprises at least a first parameter corresponding to a return address associated with the stub, a second parameter corresponding to a parameter depth (cArgs) and a third parameter corresponding to a return address of the first program module, the first, second and third parameters arranged in a top-down order; and
based on the result of said determining act, permitting execution of said first program module to proceed and returning to said second program module which issued the call and bypassing said third program module and the one or more stubs,
wherein said first program module comprises cryptographic functionality that stores and obscures a decryption key and that uses said decryption key to decrypt content.

12. The method of claim 11, further comprising:
    determining that said second program module, or a portion thereof, has not been modified relative to a previously-known state of said second program module, wherein said act of permitting execution of said first program module to proceed is further based on the determination as to whether said second program module has been modified.

13. The method of claim 11, wherein said first program module includes logic that resists misuse and/or tampering with said first program module, and wherein said determining act is performed by said first program module.

14. The method of claim 11, wherein said first program module is called by a third program module, said third program module having a callable method exposed to said second program module, said callable method causing said first program module to be invoked and passing said return address to said first program module at the time that said first program module is invoked.

15. The method of claim 14, wherein said first program module adjusts the content of said call stack to reflect that said first program module will return to said return address upon completion of execution of said call to said first program module, said call stack reflecting, in the absence of the adjustment, that said first program module will return to an address other than said return address.

16. A program module stored in a computer-readable storage medium comprising:
    a function that is performable on behalf of a calling entity; and
    logic that verifies an identity of the calling entity as a condition for performing said function, said logic consulting a call stack in order to identify said calling entity and determining said identity based on a return address on said call stack, said return address representing a location of an instruction to be executed when the program module completes execution, said logic checking a datum that represents a calling code used by the calling entity, the datum being derived from a portion or the entirety of the calling entity;
    wherein said function is not exposed to said calling entity, and wherein said function is exposed to an intermediate entity that is callable by said calling entity, said intermediate entity calling upon the program module to perform said function on behalf of said calling entity, said intermediate entity comprising one or more stubs that comprise data required by the logic to verify the identity of the calling entity, the data being mixed into instruction streams provided by the one or more stubs, the data also comprising information that is used to identify the function, wherein each stub comprises a code segment performing a unique non-standard calling convention into the program module, wherein each stub includes at least a first instruction to push function parameters onto the call stack, a second instruction to call an authenticator module for authenticating that a stub has not been modified and a third instruction comprising embedded unique data for the stub, wherein the embedded unique data comprises a vtable entry descriptor for a desired method, corresponding to a vtable for the intermediate entity, wherein the vtable is covered and comprises a list of function pointers to functions associated with the program module arranged in a random order, the random order unique for the program module;
    from the calling entity, issuing a first call to a stub in the program module associated with the desired method, whereupon after the first call, the call stack comprises at least a first parameter corresponding to a return address associated with the stub, a second parameter corresponding to a parameter depth (cArgs) and a third parameter corresponding to a return address of the calling entity, the first, second and third parameters arranged in a top-down order; and
    wherein the program module upon completing said function bypasses the intermediate entity and returns to the calling entity's return address.

17. The program module of claim 16, wherein said calling entity calls said intermediate entity using a first calling convention, and wherein said intermediate entity calls the program module using a second calling convention different from said first calling convention.

18. The program module of claim 17, wherein said calling entity calls said intermediate entity by calling a function in said intermediate entity and placing a first return address on said call stack, and wherein said intermediate entity calls the program module by calling or jumping to a location in said program module with one or more parameters including said first return address, wherein the program module verifies that said first return address is located within a calling entity that is allowed to call the program module, and wherein the program module adjusts said call stack so that a return address to be followed upon a next return instruction is equal to said first return address.

19. The program module of claim 17, wherein said first calling convention comprises placing a return address on said call stack, and wherein said second calling convention comprises placing a second return address on said call stack and placing data at the location represented by said second return address, said second return address being used to find said data, said data being used to perform at least one of: verification of the identity of the calling entity; and identification of a location at which said function is located.

20. A computer-readable storage medium having stored thereon computer-executable instructions for performing the steps of:
    examining a call stack of a process in which said first program module executes to identify a return address in which control of the process will return upon completion of a call to said first program module;
    determining that said return address is located within a second program module that is permitted to call said first program module, said determining comprising checking a datum that represents a calling code used by the second program module, the datum being derived from a portion or the entirety of the second program module, the first program module being called by the second program module via a third program module having one or more stubs with code segments that are callable by the second program module as an intermediary, the one or more stubs comprising data required during a verification by the first program module, said data required during said verification being mixed into instruction streams provided by the one or more stubs, the data also comprising information that is used to identify a function that will be invoked after the verification, wherein each stub comprises a code segment performing a unique non-standard calling convention into the second program module, wherein each stub includes at least a first instruction to push function parameters onto the call stack, a second instruction to call an authenticator module for authenticating that a stub has not been modified and a third instruction comprising embedded unique data for the stub, wherein the embedded unique data comprises a vtable entry descriptor for a desired method, corresponding to a vtable for the third program module, wherein the vtable is covered and comprises a list of function pointers to functions associated with the second program module arranged in a random order, the random order unique for the second program module;

from the first program module, issuing a first call to a stub in the third program module associated with the desired method, whereupon after the first call, the call stack comprises at least a first parameter corresponding to a return address associated with the stub, a second parameter corresponding to a parameter depth (cArgs) and a third parameter corresponding to a return address of the first program module, the first, second and third parameters arranged in a top-down order; and based on the result of said determining act, permitting execution of said first program module to proceed and returning to said second program module which issued the call and bypassing said third program module and the one or more stubs, wherein said first program module comprises cryptographic functionality that stores and obscures a decryption key and that uses said decryption key to decrypt content.

* * * * *